(12) United States Patent
Fuxa

(10) Patent No.: US 9,323,617 B2
(45) Date of Patent: Apr. 26, 2016

(54) REMAP RAID TO MAINTAIN RAID LEVEL

(71) Applicant: Hewlett-Packard Development Company, L.P., Fort Collins, CO (US)

(72) Inventor: James Alexander Fuxa, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 144 days.

(21) Appl. No.: 13/907,674

(22) Filed: May 31, 2013

(65) Prior Publication Data

US 2014/0359347 A1    Dec. 4, 2014

(51) Int. Cl.
*G06F 11/00*    (2006.01)
*G06F 11/10*    (2006.01)

(52) U.S. Cl.
CPC .................................. *G06F 11/1096* (2013.01)

(58) Field of Classification Search
CPC ............ G06F 11/2053; G06F 11/1076; G06F 11/1008; G06F 11/1092; G06F 11/2094
USPC ........................................................ 714/6.22
See application file for complete search history.

(56) References Cited

U.S. PATENT DOCUMENTS

| | | | |
|---|---|---|---|
| 6,567,889 B1 | 5/2003 | DeKoning et al. | |
| 7,139,931 B2 | 11/2006 | Horn | |
| 7,856,528 B1 | 12/2010 | Frost et al. | |
| 8,074,017 B2 | 12/2011 | Cavallo | |
| 8,285,931 B2 | 10/2012 | Ledford et al. | |
| 8,321,721 B2 | 11/2012 | Soran et al. | |
| 2009/0177918 A1* | 7/2009 | Abali et al. | 714/7 |
| 2010/0115198 A1* | 5/2010 | Jess | 711/114 |
| 2011/0087855 A1 | 4/2011 | Frost et al. | |
| 2012/0221781 A1 | 8/2012 | Frost et al. | |
| 2012/0266050 A1* | 10/2012 | Cideciyan | H03M 13/05 714/773 |
| 2013/0111161 A1* | 5/2013 | Kotzur et al. | G06F 12/0246 711/161 |

OTHER PUBLICATIONS

Gibson, G. et al., Raidframe: Rapid Prototyping for Disk Arrays, (Research Paper), Oct. 18, 1995, http://users.ece.cmu.edu/~wc25/CMU-CS-95-200.pdf.

* cited by examiner

*Primary Examiner* — Yair Leibovich
(74) *Attorney, Agent, or Firm* — Hewlett Packard Enterprise Patent Department

(57) ABSTRACT

A failure of at least one of a plurality of drives of a redundant array of independent disks (RAID) is determined. A remainder of the plurality of drives of the RAID are remapped. A RAID level of the RAID is maintained, if the remainder of the plurality of drives are remapped.

13 Claims, 4 Drawing Sheets

(RAID 10 level not maintained)

(RAID 10 level maintained)

(RAID 5 level not maintained)

(RAID 5 level maintained)

REMAP RAID TO MAINTAIN RAID LEVEL

BACKGROUND

Some types of storage technologies, such as a redundant array of independent disks (RAID), provide fault tolerance by incorporating a plurality of drives. Different RAID architectures or levels provide a different balance between performance, capacity and tolerance.

However, if at least one of the plurality of drives fails, the RAID may not be able to continue providing the same balance of performance, capacity and tolerance. Therefore, the RAID may not be able to maintain its RAID level if at least one of the plurality of disks fails. Manufacturers and/or vendors are challenged to continue providing satisfactory performance, capacity and tolerance in the event of a drive failure.

BRIEF DESCRIPTION OF THE DRAWINGS

The following detailed description references the drawings, wherein.

DETAILED DESCRIPTION

Figure 1:
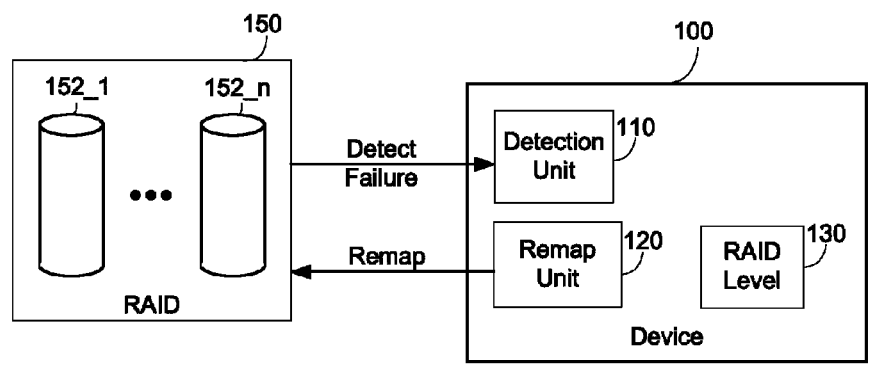
FIG. 1 is an example block diagram of a device to maintain a RAID level of a RAID and to reduce a size of the RAID.

Specific details are given in the following description to provide an understanding of examples of the present techniques. However, it will be understood that examples of the present techniques may be practiced without these specific details. For example, systems may be shown in block diagrams in order not to obscure examples of the present techniques in unnecessary detail. In other instances, well-known processes, structures and techniques may be shown without unnecessary detail in order to avoid obscuring the examples of the present techniques.

A Redundant array of independent (or inexpensive) disks (RAID) may refer to a category of disk drives that employ two or more drives in combination for fault tolerance and performance. The RAID may allow for data to be stored redundantly and/or in multiple paces in a balanced way to improve overall storage performance. The RAID may also include parity information such as Error-Correcting Coding (ECC).

When a drive fails in a traditional RAID set the array as a whole may go offline (such as for RAID 0) or performance/reliability may be reduced (such as for RAID 10 or RAID 5). For example, assume a RAID 5 has n drives. If one of those n drives fails, and the array continues to operate in a degraded state, then write and read operations may become slower. For instance, a read operation that was destined for the failed drive may now require n−1 drive reads and an XOR calculation. A write operation that previously required n−1 reads and an XOR calculation may now require 2 reads and an XOR calculation, after the drive fails. Along with slower performance, the RAID 5 may now also be susceptible to data loss if another drives fails. Similarly for a RAID 0 array, if a drive fails the array may be generally taken offline. Thus, the entire array may become unavailable.

However, instead of resulting in slower performance and/or data loss due to a drive failure, examples of the present technique may reduce a size of the array, such as to (n−1)/n. This may be preferable where keeping a volume in an online accessible state is more important than a size of the volume, such as if the array is being used as a cache volume (rather a data volume).

Examples of present techniques may keep an array online and functional with the same RAID protection but with a reduced size, in the event that one or more drives fail. An example device may include a detection unit and a remap unit. The detection unit may detect a failure of at least one of a plurality of drives of a RAID. The remap unit may remap a remainder of the plurality of drives, if one of the plurality of drives fails. The remap unit may maintain a RAID level of the RAID and reduce a size of the RAID, if the remap unit remaps the remainder of the plurality of drives.

Thus, examples of present techniques may extend existing RAID technologies by enabling them to remain relevant even after drives are no longer accessible by maintaining a same level of a performance and reliability. For example, a RAID 0 volume with n drives that experiences a drive failure will change from a size of n to 2n/3. However the volume will remain online and accessible. Further, a RAID 10 volume would still be able maintain redundancy if one of the drives failed. While a cache volume is described above, examples of present techniques may apply to any data deduplication scenario or file system management schema that does not require a fixed storage size.

Referring now to the drawings, FIG. 1 is an example block diagram of a device 100 to maintain a RAID level of a RAID 150 and to reduce a size of the RAID 150. The device 100 may couple to or be included in any type of computing device or controller that interfaces with a storage device, such as a secure microprocessor, a storage device controller, a notebook computer, a desktop computer, an all-in-one system, a server, a network device, a wireless device and the like.

In the example of FIG. 1, device 100 interfaces with the RAID 150. Further, the device 100 includes a detection unit 110 and a remap unit 120. The detection and remap units 110 and 120 may include, for example, a hardware device including electronic circuitry for implementing the functionality described below, such as control logic and/or memory. In addition or as an alternative, the detection and remap unit 110 and 120 may be implemented as a series of instructions encoded on a machine-readable storage medium and executable by a processor.

The term RAID may refer to a storage technology that combines multiple disk drive components into a logical unit. Data is distributed across the drives in one of several ways may be called "RAID levels," depending on the level of redundancy and performance required. Here, the RAID 150 is shown to include a plurality of drives 152_1 to 152_n, where n is a natural number. The term drive may refer to any category of storage mechanisms where data are recorded by various electronic, magnetic, optical, or mechanical changes to a surface layer of one or more rotating disks.

The detection unit 110 may detect a failure of at least one of the plurality of drives 152_1 to 152_n of the RAID. For example, detection unit 110 may poll the plurality of drives 152_1 to 152_n or receive an interrupt if at least one of the plurality of drives 152_1 to 152_n fails. The remap unit 120 may remap a remainder of the plurality of drives 152_1 to 152_n, if one of the plurality of drives 152_1 to 152_n fails. The term remap may refer to changing an existing mapping scheme, such as logical block addressing (LBA). LBA may refer to a linear addressing scheme where blocks are located by an integer index, with the first block being LBA 0, the second LBA 1, and so on. Only one number is used to address data, and each linear base address (LBA) describes a single block of data. Thus, each LBA number may correlate to a different block of data stored on computer storage devices, such as the drives 152_1 to 152_n.

The remapping of the remainder of the plurality of drives 152_1 to 152_n may be carried out in a plurality of ways. For example, the remapping may be carried at a logical level at the device 100 or at a physical level at the RAID 150. If the remapping is carried out at the logical level at the device 100, then the remap unit 120 may simply reduce and/or reorganize the LBAs without physically moving any of the data located at the remainder of the plurality of drives 152_1 to 152_n. For example, if LBA 0 initially pointed to a block of the first drive 152_1, which then failed, the remap 120 may first recalculate the data initially pointed to by the LBA. Then the remap unit 120 may store the recalculated data at an empty block of one of the remainder of the plurality of drives 152_1 to 152_n. Lastly, the remap unit 120 may remap the LBA 0 to instead point to the block storing the recalculated data. Other blocks of the remainder of the plurality of drives 152_1 to 152_n that already store data are not shifted in this scenario.

Conversely, if the remapping is carried out at the physical level at the RAID 150, then the remap unit 120 may send commands to physically shift data among the blocks of the remainder of the plurality of drives 152_1 to 152_n. For example, if LBA 0 initially pointed to a first block of the first drive 152_1 and the first drive 152_1 failed, the remap unit 120 may calculate the data that was at the first block and store the calculated data at a first block of the second drive 152_2. The remap unit 120 may also update LBA 0 to now point to the first block of the second drive 152_1. If the first block of the second drive 152_1 had previously stored data, the above process may be iteratively repeated to shift this data another block. Thus, the remap unit 120 may shift logically and/or physically shift LBAs of the RAID 150 based on which of the plurality of drives 152_1 to 152_n fails.

The remap unit 120 may maintain a RAID level 130 of the RAID and may reduce a size of the RAID, if the remap unit 120 remaps the remainder of the plurality of drives 152_1 to 152_n. For example, assume the RAID 150 had 4 drives (n=4), which provided a total of m blocks that correlated to m LBAs. If one of the drives failed, the number of blocks and the number of LBAs would be reduced to 3m/4 by the remap unit 120. For instance, if the LBAs has previously spanned from 0-999, the remap unit 120 would remove the top 25% of LBAs so that the LBAs would span 0-749. In doing so, the remap unit 120 may still maintain the properties of the RAID level of the RAID 150

In one instance, the remap unit 120 may reduce a number of the LBAs while maintaining striping if the RAID level 130 includes striping and at least one of the drives 152_1 to 152_n fails, such as for RAID 0, 2, 3, 4, 5, 6 and 10. For example, a RAID 0 array, which does not include parity or mirroring may be able to stay online at a reduced size after being remapped by the remap unit 120, if one of the drives 152_1 to 152_n fails.

In another instance, the remap unit 120 may reduce a number of the LBAs while maintaining mirroring for the RAID if the RAID level 130 includes mirroring and at least one of the drives 152_1 to 152_n fails, such as for RAID 1 and 10. For example, a RAID 10 array may be able to maintain striping and mirroring at a reduced size after being remapped by the remap unit 120, if one of the drives 152_1 to 152_n fails.

In yet another instance, the remap unit 120 may reduce a number of the LBAs while maintaining parity if the RAID level 130 includes parity and at least one of the drives 152_1 to 152_n fail, such as for RAID 2, 3, 4, 5 and 6. For example, a RAID 5 array may be able to maintain striping and parity at a reduced size after being remapped by the remap unit 120, if one of the drives 152_1 to 152_n fails. Examples of the RAID 10 and 5 arrays being remapped by the remap unit 120 are provided in greater detail below with respect to FIGS. 3A to 4B.

Figure 2:
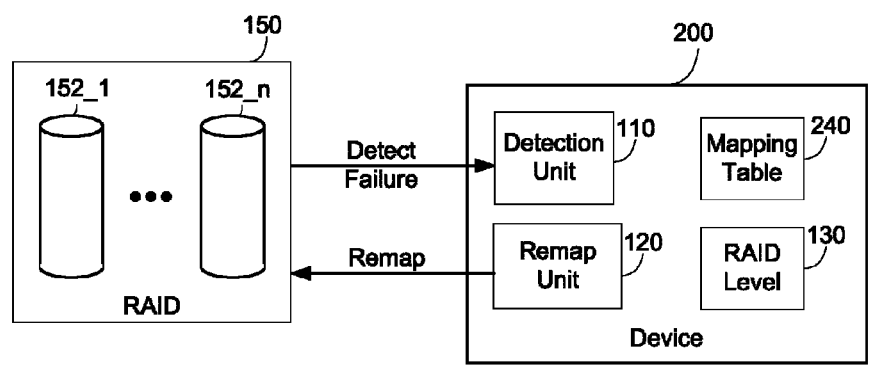
FIG. 2 is another example block diagram of a device to maintain a RAID level of a RAID and to reduce a size of the RAID.

FIG. 2 is another example block diagram of a device 200 to maintain a RAID level 130 of the RAID 150 and to reduce a size of the RAID 150. The device 200 may couple to or be included in any type of computing device or controller that interfaces with a storage device, such as a secure microprocessor, a storage device controller, a notebook computer, a desktop computer, an all-in-one system, a server, a network device, a wireless device and the like.

The device 200 of FIG. 2 may include at least the functionality and/or hardware of the device 100 of FIG. 1. For example, the device 200 of FIG. 2 includes the detection unit 110 and the remap unit 120 of the device 100 of FIG. 1. The device 200 further includes a mapping table 240. Similar to FIG. 1, the device 200 also interfaces with the RAID 150.

The mapping table 240 may include, for example, a hardware device including electronic circuitry for implementing the functionality described below, such as control logic and/or memory. In addition or as an alternative, the mapping table 240 may be implemented as a series of instructions encoded on a machine-readable storage medium and executable by a processor.

The mapping table 240 may change the map between the LBAs and the physical blocks without shifting the physical blocks of data at the remainder of the plurality of drives 152_1 to 152_n, if one of the plurality of drives 152 fails and the remap unit 120 remaps the remainder of the drives 152_1 to 152_n at the logical level. Otherwise, even if the remainder of the drives 152_1 to 152_n are remapped at the physical level, the mapping table 240 may still change the map between at least some of the LBAs and the physical blocks. The mapping table 240 may also map the LBAs of the RAID 150 to physical blocks of data stored at a main memory (not shown), where the RAID 150 may act as a cache for the main memory.

In one example, the remap unit 120 may remap a data block of the remainder of the plurality of drives 152_1 to 152_n to a parity block, if the failed drive 152 included a parity block. In this case, the remap unit 120 may mark data located in a mapping table 240 and associated with the remapped block as invalid. The remap unit 120 may calculate and store parity information to the remapped block based on an XOR calculation of data blocks having a same stripe as the remapped block. For instance, if there are four drives 152_1 to 152_4, a block from each of the four drives 152_1 to 152_4 may form a single stripe, with three of the blocks being data blocks and the fourth block being the parity block.

The remap unit 120 may also update a parity block of at least one of the stripes based on a reduced RAID stripe size, if at least one of the drives 152_1 to 152_n fails. For instance, if the RAID 150 is reduced from four to three drives 152_1 to 152_3, the parity block may be updated to be only based on an XOR operation of blocks from these three drives 152_1 to 152_3 (and not the fourth drive 152_4).

Figure 3A:
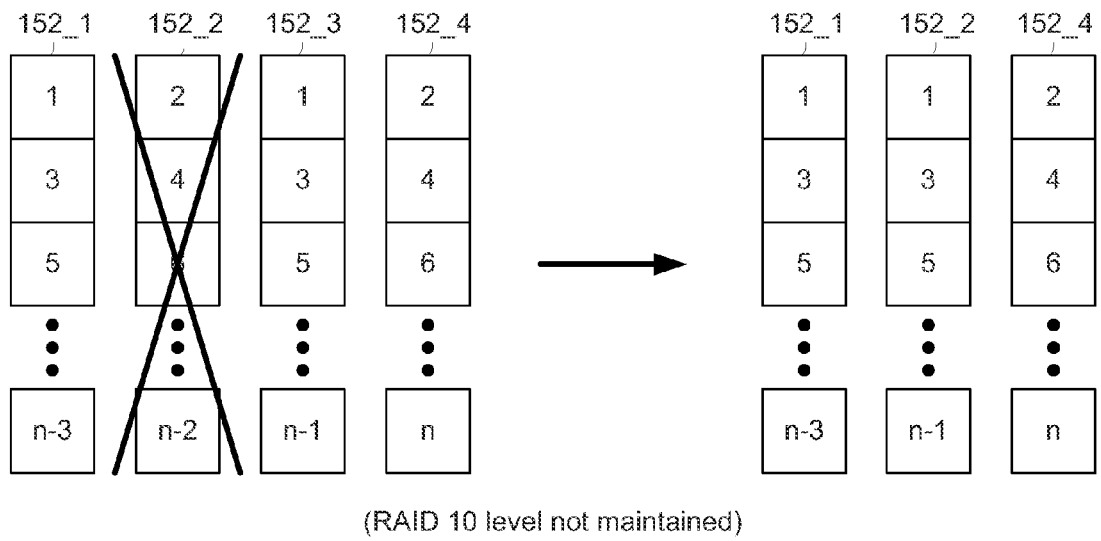
FIGS. 3A and 3B are example block diagrams of a RAID 10 level array that loses a drive both with and without the device of FIG. 2.
Figure 3B:
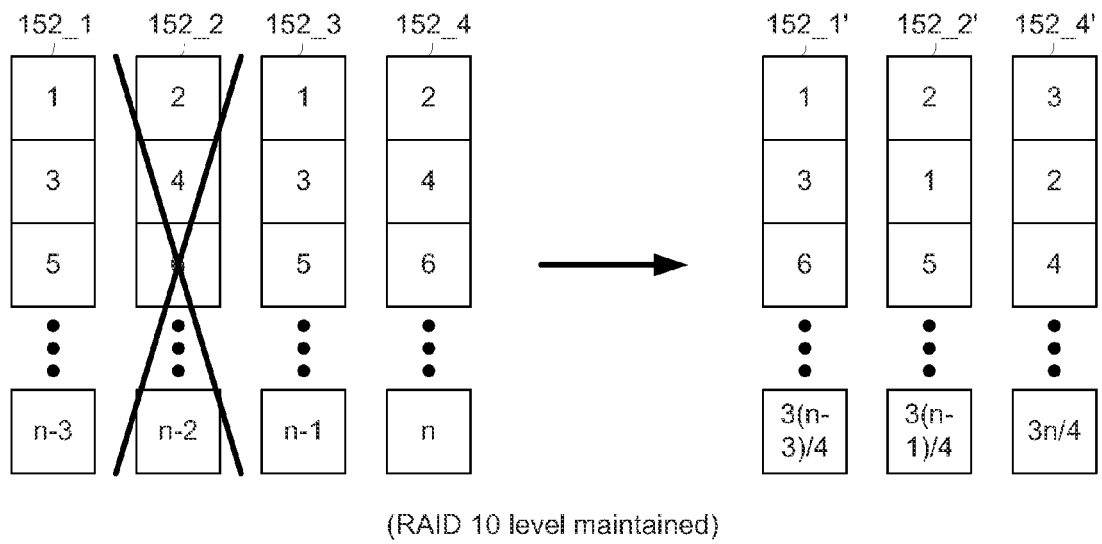

FIGS. 3A and 3B are example block diagrams of a RAID 10 level array that loses a drive both with and without the device of FIG. 2. The block diagrams may represent the RAID 150 itself or a mapping of the RAID 150, such as the mapping table 240. As noted above, there are a number of different RAID levels. For RAID 10, mirroring and striping is provided. Striping may refer to spreading out blocks of data across multiple drives. Mirroring may refer to writing data in duplicate to at least two drives. RAID 10 writes data in stripes across primary drives that have been mirrored to secondary drives. Thus, multiple RAID 1 mirrors are created, and a RAID 0 stripe is created over these multiple RAID 1 mirrors.

FIGS. 3A and 3B show the RAID 150 to have four drives 152_1 to 152_4 and a RAID 10 level. However, in FIG. 3A the device 200 is not present. Thus, when the second drive 152_2 fails, the LBAs for the remainder of the drives 152_1, 152_2 and 152_4 are not shifted or reduced. As a result, redundancy is lost for any LBAs previously mapped to the blocks of the second drive 152_2. If another of the remainder of the drives 152_1, 152_2 and 152_4 were lost, data would likely be lost.

Yet in FIG. 3B, where the device 200 is present, the LBAS are shifted and/or reduced after the second drive 152_2 fails. For example, there are two copies of LBA 2 in FIG. 3B but there is only one copy of LBA 2 in FIG. 3A. Further, the number of LBAs is reduced from n to 3n/4, with there being two copies of each of the LBAs between the remainder of the three drives 152_1', 152_2' and 152_4'. Therefore, the RAID 10 level is maintained in FIG. 3B when one of the drives 152_2 fails, unlike in FIG. 3A.

Figure 4A:
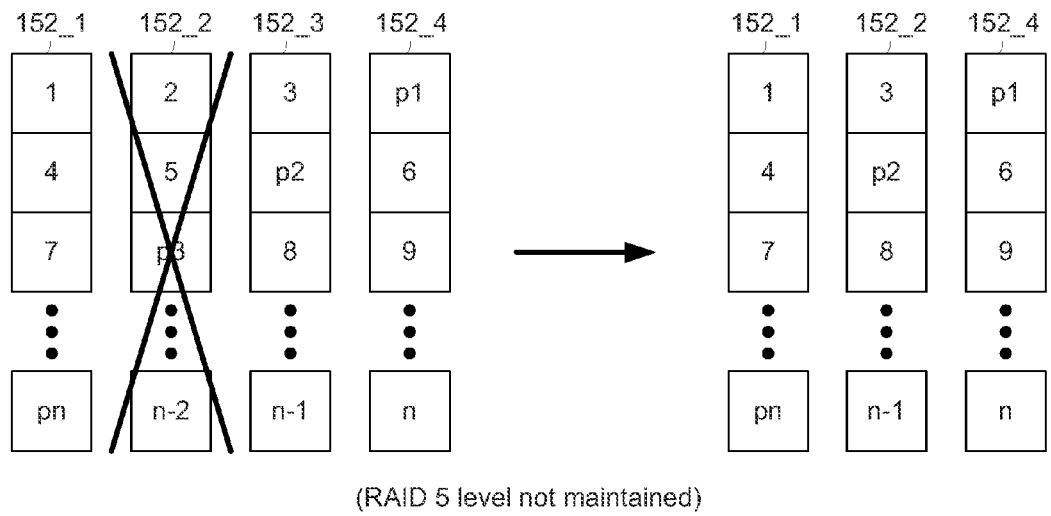
FIGS. 4A and 4B are example block diagrams of a RAID 5 level array that loses a drive both with and without the device of FIG. 2.
Figure 4B:
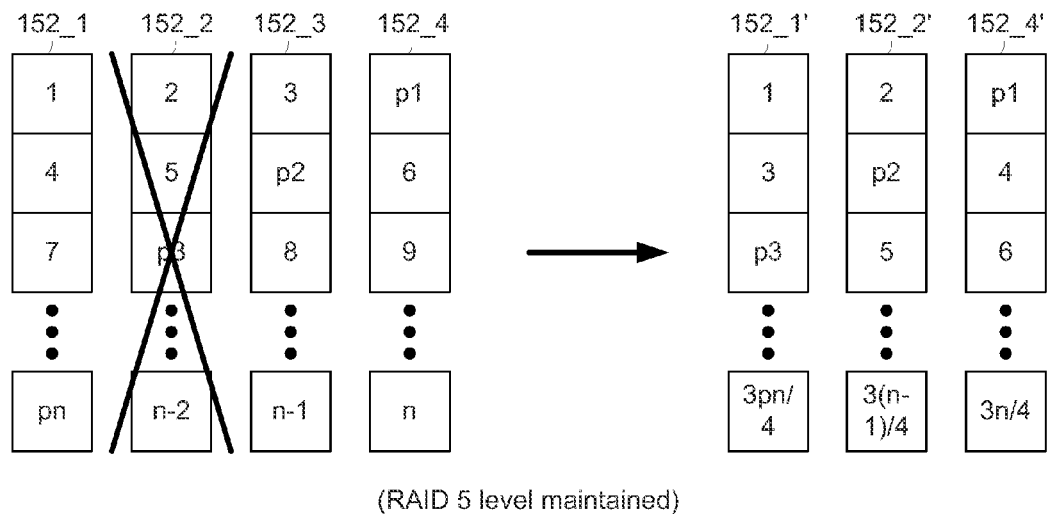

FIGS. 4A and 4B are example block diagrams of a RAID 5 level array that loses a drive both with and without the device of FIG. 2. The block diagrams may represent the RAID 150 itself or a mapping of the RAID 150, such as the mapping table 240. For RAID 5, block-level striping with distributed parity is provided. RAID 5 distributes parity along with the data and requires all drives but one to be present to operate. Thus, the array is not destroyed by a single drive failure. Upon drive failure, any subsequent reads can be calculated from the distributed parity such that the drive failure is masked from the end user. RAID 5 may require at least three drives.

FIGS. 4A and 4B show the RAID 150 to have four drives 152_1 to 152_4 and a RAID 5 level. However, in FIG. 4A the device 200 is not present. Thus, when the second drive 152_2 fails, the LBAs for the remainder of the drives 152_1, 152_2 and 152_4 are not shifted or reduced. As a result, data blocks (such as LBAs 2 and 5) and at least one parity block (such as p3) are lost. If access is requested to these lost data or parity blocks, they may be recalculated based on the remaining blocks of each stripe. For example, if access to the data corresponding to LBA 2 is requested, this data may be recalculate based on XOR operations of the data at LBAs 1 and 3 and the parity block p1, which are part of the same stripe. Nonetheless, these calculations may consume additional power and increase latency. Further, if another of the remainder of the drives 152_1, 152_2 and 152_4 were lost, data would likely be lost too.

Yet in FIG. 4B, where the device 200 is present, the LBAs are shifted and/or reduced after the second drive 152_2 fails. For example, the data at LBAs 2 and 5 and the parity block p3 are not lost. Here, these blocks have been recalculated and then stored to at least one of the three remaining drives 152_1', 152_2' and 152_4'. Further, the LBAs are continuous in FIG. 4B, unlike in FIG. 4A, even if the total number of LBAs has been reduced from n to 3n/4. Moreover, there is a parity block for each of the stripes in FIG. 4B, unlike FIG. 4A which lacks the parity block for the third stripe (7,8,9). Therefore, the RAID 5 level is maintained in FIG. 4B when one of the drives 152_2 fails, unlike in FIG. 4A.

Figure 5:
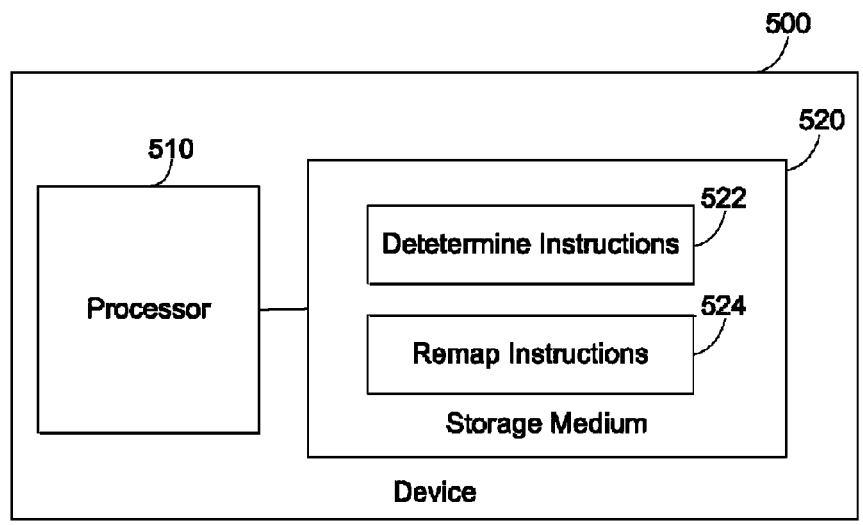
FIG. 5 is an example block diagram of a computing device including instructions for remapping a remainder of drives to maintain a RAID level.

FIG. 5 is an example block diagram of a computing device 500 including instructions for remapping a remainder of drives to maintain a RAID level. In FIG. 5, the computing device 500 includes a processor 510 and a machine-readable storage medium 520. The machine-readable storage medium 520 further includes instructions 522 and 524 for remapping a remainder of drives (not shown) to maintain a RAID level.

The computing device 500 may be, for example, a controller, a secure microprocessor, a notebook computer, a desktop computer, an all-in-one system, a server, a network device, a wireless device, or any other type of user device capable of executing the instructions 522 and 524. In certain examples, the computing device 300 may include or be connected to additional components such as memories, sensors, displays, etc.

The processor 510 may be, at least one central processing unit (CPU), at least one semiconductor-based microprocessor, other hardware devices suitable for retrieval and execution of instructions stored in the machine-readable storage medium 520, or combinations thereof. The processor 510 may fetch, decode, and execute instructions 522 and 524 to implement remapping the remainder of the drives to maintain the RAID level. As an alternative or in addition to retrieving and executing instructions, the processor 510 may include at least one integrated circuit (IC), other control logic, other electronic circuits, or combinations thereof that include a number of electronic components for performing the functionality of instructions 522 and 524.

The machine-readable storage medium 520 may be any electronic, magnetic, optical, or other physical storage device that contains or stores executable instructions. Thus, the machine-readable storage medium 520 may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium 520 can be non-transitory. As described in detail below, machine-readable storage medium 520 may be encoded with a series of executable instructions for remapping the remainder of the drives to maintain the RAID level.

Figure 6:
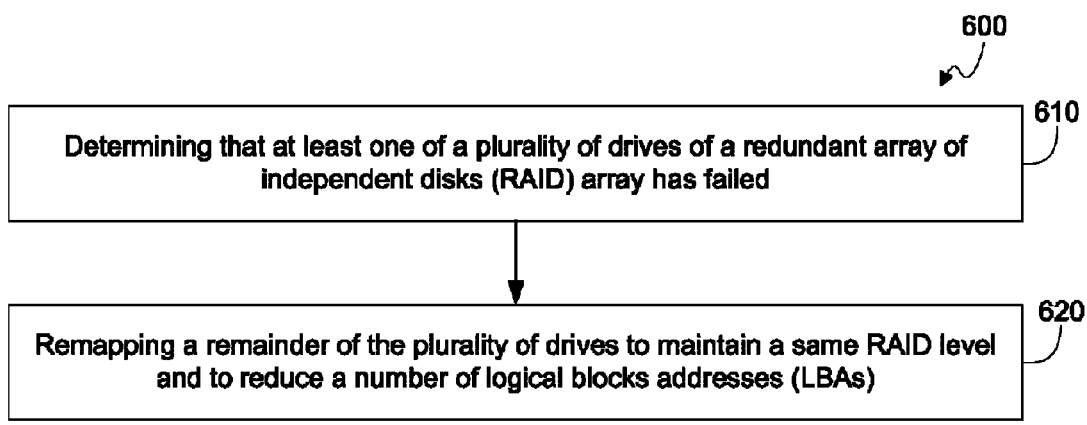
FIG. 6 is an example flowchart of a method for remapping a remainder of drives to maintain a same RAID level.

Moreover, the instructions 522 and 524 when executed by a processor (e.g., via one processing element or multiple processing elements of the processor) can cause the processor to perform processes, such as, the process of FIG. 6. For example, the determine instructions 522 may be executed by the processor 510 to determine which of a plurality of drives of a RAID (not shown) has failed. The remap instructions 524 may be executed by the processor 510 to remap the remainder of the drives of the RAID based on the RAID level of the RAID before the drive failed. The remainder of the drives of the RAID are remapped to maintain the RAID level. The LBAs corresponding to the plurality of the drives may be shifted and reduced when the RAID is remapped.

FIG. 6 is an example flowchart of a method 600 for remapping a remainder of drives to maintain a same RAID level. Although execution of the method 600 is described below with reference to the device 200, other suitable components for execution of the method 600 can be utilized, such as the device 100. Additionally, the components for executing the method 600 may be spread among multiple devices (e.g., a processing device in communication with input and output devices). In certain scenarios, multiple devices acting in coordination can be considered a single device to perform the method 600. The method 600 may be implemented in the form of executable instructions stored on a machine-readable storage medium, such as storage medium 520, and/or in the form of electronic circuitry.

At block 610, the device 200 determines that at least one of a plurality of drives 152_1 to 152_n of a RAID 150 has failed. Then, at block 620, the device 200 remaps a remainder of the plurality of drives 152_1 to 152_n to maintain a same RAID level 130 and to reduce a number of LBAs. The LBAs are to be mapped to the remainder of the plurality of drives 152_1 to 152_n and to be continuous. For example, the remapping at block 620 may include maintaining at least one of mirroring, striping and parity for the RAID 150 when the same RAID level 130 is maintained. Further, the remapping at block 620 may include at least one of shifting the LBAs and calculating new parity information for the remainder of the drives 152_1 to 152_n based on which of the drives 152_1 to 152_n has failed.

According to the foregoing, examples of present techniques provide a method and/or device that keep an array online and functional with the same RAID protection but with a reduced size, in the event that one or more drives fail. Thus, examples of present techniques may extend existing RAID technologies by enabling them to remain relevant even after drives are no longer accessible by maintaining a same level of a performance and reliability.

I claim:

1. A device comprising a processor, the processor comprising:
    a detection unit to detect a failure of at least one of a plurality of drives of a redundant array of independent disks (RAID);
    a remap unit to remap a remainder of the plurality of drives, if one of the plurality of drives fails; and
    a mapping table, wherein
    the remap unit is to maintain a RAID level of the RAID and to reduce a size of the RAID, if the remap unit remaps the remainder of the plurality of drives,
    the remap unit is to shift logical block addresses (LBAs) of the RAID based on which of the plurality of drives failed,
    the mapping table is to map the LBAs of the RAID to physical blocks of data stored at a main memory, and
    the RAID is to be a cache for the main memory.

2. The processor of claim 1, wherein the remap unit is to reduce a number of the LBAs while maintaining striping if the RAID level includes striping and at least one of the drives fails.

3. The processor of claim 1, wherein the remap unit is to reduce a number of the LBAs while maintaining mirroring for the RAID if the RAID level includes mirroring and at least one of the drives fails.

4. The processor of claim 1, wherein the remap unit is to reduce a number of the LBAs while maintaining parity if the RAID level includes parity and at least one of the drives fails.

5. The processor of claim 4, wherein,
    the remap unit is to remap a data block of the remainder of the plurality of drives to a parity block, if the failed drive included a parity block, and
    the remap unit is to mark data located in a mapping table and associated with the remapped block as invalid.

6. The processor of claim 5, wherein the remap unit is to calculate and store parity information to the remapped block based on an XOR calculation of data blocks having a same stripe as the remapped block.

7. The processor of claim 4, wherein the remap unit is to update a parity block of at least one of the stripes based on a reduced RAID stripe size, if at least one of the drives fails.

8. The device of claim 1, wherein the mapping table is to change the map between the LBAs and the physical blocks without shifting the physical blocks of data at the remainder of the plurality of drives, if one of the plurality of drives fails.

9. A method, comprising:
    determining that at least one of a plurality of drives of a redundant array of independent disks (RAID) has failed; and
    remapping a remainder of the plurality of drives to maintain a same RAID level and to reduce a number of logical blocks addresses (LBAs), wherein
    the LBAs are to be mapped to the remainder of the plurality of drives and to be continuous,
    the remapping is to shift the LBAs of the RAID based on which of the plurality of drives failed,
    the remapping is to map, at a mapping table, the LBAs of the RAID to physical blocks of data stored at a main memory, and
    the RAID is to be a cache for the main memory.

10. The method of claim 9, wherein the remapping is to maintain at least one of mirroring, striping and parity for the RAID when the same RAID level is maintained.

11. The method of claim 9, wherein the remapping is to calculate Previously presented parity information for the remainder of the drives based on which of the drives has failed.

12. A non-transitory computer-readable storage medium storing instructions that, if executed by a processor of a device, cause the processor to:
    determine which of a plurality of drives of a redundant array of independent disks (RAID) has failed; and
    remap a remainder of the drives of the RAID based on a RAID level of the RAID before the drive failed, wherein
    the remainder of the drives are remapped to maintain the RAID level,
    logical block addresses (LBAs) of the RAID are shifted based on which of the plurality of drives failed when the remainder of the drives are remapped,
    the LBAs of the RAID are mapped at a mapping table to physical blocks of data stored at a main memory, and
    the RAID is to be a cache for the main memory.

13. The non-transitory computer-readable storage medium of claim 12, wherein the LBAs corresponding to the plurality of the drives are reduced when the RAID is remapped.

* * * * *